United States Patent
Suzuki et al.

(10) Patent No.: US 11,340,590 B2
(45) Date of Patent: May 24, 2022

(54) DATA COLLECTION SYSTEM, DATA COLLECTION METHOD, AND INFORMATION STORAGE MEDIUM

(71) Applicant: Kabushiki Kaisha Yaskawa Denki, Kitakyushu (JP)

(72) Inventors: Takahiko Suzuki, Kitakyushu (JP); Shinichiro Obata, Kitakyushu (JP); Takaaki Shogaki, Kitakyushu (JP); Megumi Yasuda, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 0 days.

(21) Appl. No.: 16/999,085

(22) Filed: Aug. 21, 2020

(65) Prior Publication Data

US 2021/0064010 A1  Mar. 4, 2021

Related U.S. Application Data

(60) Provisional application No. 62/906,736, filed on Sep. 27, 2019.

(30) Foreign Application Priority Data

Aug. 30, 2019  (JP) .............................. JP2019-158087

(51) Int. Cl.
  *G05B 19/418*  (2006.01)
  *G06F 16/9035*  (2019.01)
  *G06F 9/30*  (2018.01)

(52) U.S. Cl.
  CPC ..... *G05B 19/4183* (2013.01); *G05B 19/4185* (2013.01); *G05B 19/41865* (2013.01); *G06F 9/30098* (2013.01); *G06F 16/9035* (2019.01)

(58) Field of Classification Search
  CPC ............ G05B 19/4183; G05B 19/4185; G05B 19/41865; G05B 23/0221; G05B 2219/31282; G06F 16/9035; G06F 9/30098
  See application file for complete search history.

(56) References Cited

U.S. PATENT DOCUMENTS

| 6,385,497 B1 | 5/2002 | Ogushi et al. |
| 2002/0065572 A1 | 5/2002 | Ina et al. |
| 2008/0125877 A1* | 5/2008 | Miller .................... G05B 15/02 700/29 |

(Continued)

FOREIGN PATENT DOCUMENTS

| JP | H1115520 A | 1/1999 |
| JP | H11338535 A | 12/1999 |

(Continued)

OTHER PUBLICATIONS

Office Action dated Jan. 14, 2020 for corresponding JP application No. 2019-158087 with partial English translation.

(Continued)

*Primary Examiner* — Christopher E. Everett
(74) *Attorney, Agent, or Firm* — HEA Law PLLC

(57) ABSTRACT

A data collection system, comprising circuitry configured to: set a sharable public variable from among a plurality of variables of an industrial machine controlled by a control device; collect data on the industrial machine based on the public variable; and record the data in a first storage.

17 Claims, 9 Drawing Sheets

(56) References Cited

U.S. PATENT DOCUMENTS

| | | |
|---|---|---|
| 2010/0011216 A1 | 1/2010 | Holm-Hansen et al. |
| 2012/0065748 A1* | 3/2012 | Nixon .................... G05B 21/02 |
| | | 700/73 |
| 2014/0201571 A1 | 7/2014 | Hosek et al. |
| 2016/0238659 A1 | 8/2016 | Shiromoto et al. |
| 2016/0274552 A1* | 9/2016 | Strohmenger ......... G06Q 10/06 |
| 2018/0336742 A1 | 11/2018 | Geeroms et al. |
| 2019/0163171 A1* | 5/2019 | Nagata ............. G05B 19/41835 |
| 2019/0166202 A1 | 5/2019 | Nagata et al. |

FOREIGN PATENT DOCUMENTS

| | | |
|---|---|---|
| JP | 2002163016 A | 6/2002 |
| JP | 2011527806 A | 11/2011 |
| JP | 2011248833 A | 12/2011 |
| JP | 2017102720 A | 6/2017 |
| JP | 2019096210 A | 6/2019 |
| WO | 2015068210 A1 | 5/2015 |
| WO | 2017097429 A1 | 6/2017 |

OTHER PUBLICATIONS

Office Action dated Jun. 9, 2020 for corresponding JP application No. 2019-158087 with partial English translation.
Search Report dated Jan. 26, 2021, for corresponding EP Patent Application No. 20192237.4 pp. 1-9.

* cited by examiner

FIG.6

| PUBLIC VARIABLE | VALUE |
|---|---|
| VARIABLE A | 15 |
| VARIABLE B | 121 |
| VARIABLE C | 1 |
| . . . | . . . |

D1

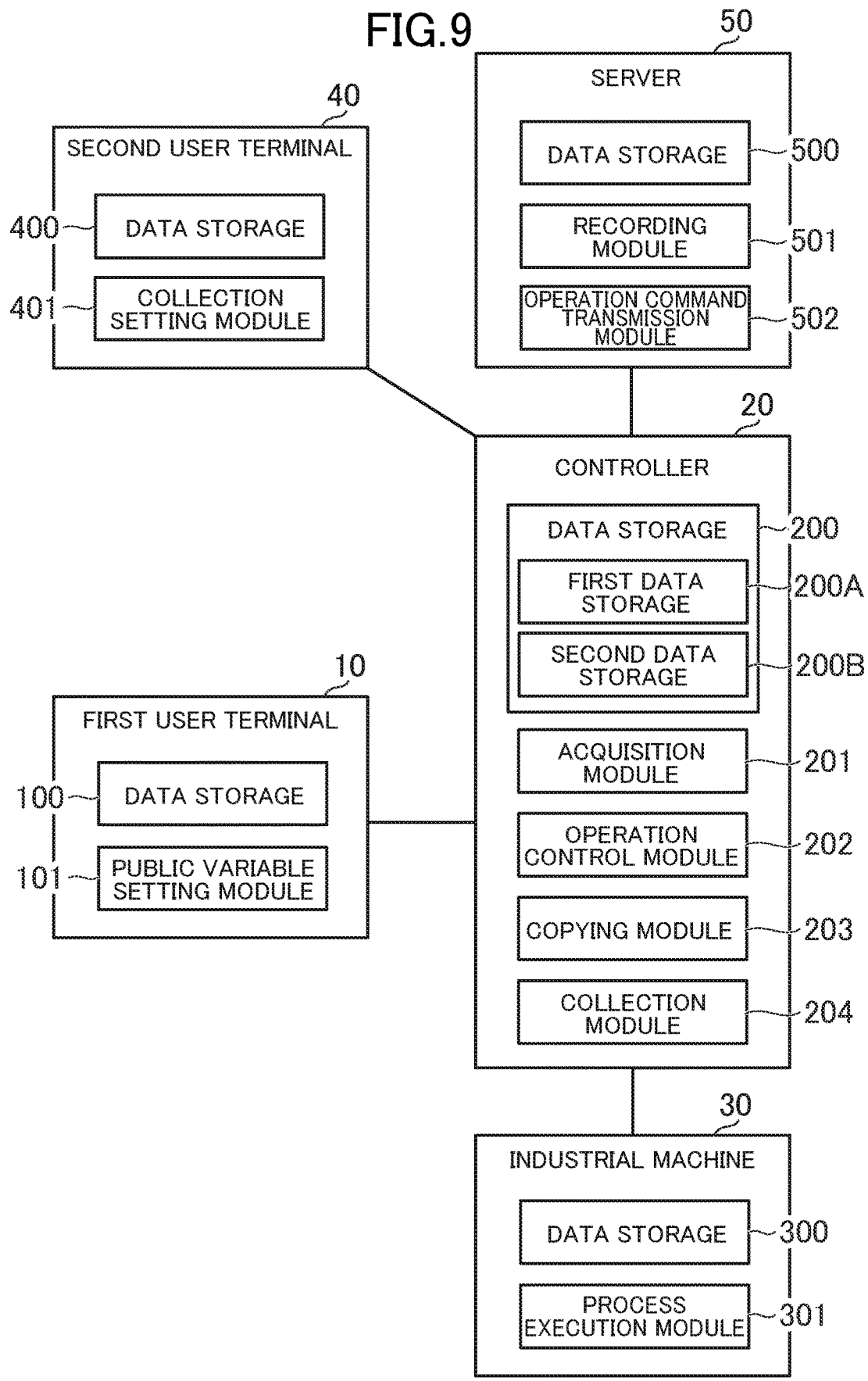

DATA COLLECTION SYSTEM, DATA COLLECTION METHOD, AND INFORMATION STORAGE MEDIUM

CROSS-REFERENCE TO RELATED APPLICATION

The present disclosure contains subject matter related to that disclosed in Japanese Patent Application JP2019-158087 filed in the Japan Patent Office on Aug. 30, 2019 and Provisional Application U.S. 62/906,736 in the United States Patent and Trademark Office on Sep. 27, 2019 the entire contents of which are hereby incorporated by reference.

BACKGROUND OF THE INVENTION

1. Field of the Invention

The embodiments disclosed herein relate to a data collection system, a data collection method, and an information storage medium.

2. Description of the Related Art

In WO 2015/068210 A1, there is described a system configured to collect data on an operation of an industrial machine controlled by a control device, upload the collected data to a cloud server, and to request an analyst to analyze the data.

SUMMARY OF THE INVENTION

According to one aspect of the present invention, there is provided a data collection system including circuitry configured to: set a sharable public variable from among a plurality of variables of an industrial machine controlled by a control device; collect data on the industrial machine based on the public variable; and record the data in a first storage.

BRIEF DESCRIPTION OF THE DRAWINGS

FIG. 6 is a table for showing a data storage example of variable value data.

FIG. 9 is a functional block diagram in Modification Example (3) of the present invention.

DESCRIPTION OF THE EMBODIMENTS

1. Overall Configuration of Data Collection System

From a viewpoint of the inventor (s) of the present invention, when data on an industrial machine is collected based on variables of the industrial machine, there is no distinction between shared variables and unshared variables, and it has been possible to collect data for any variable. As a result of extensive research and development for collecting and recording data on industrial machines based on sharable public variables, the inventor(s) of the present invention has (have) conceived of a novel and original data collection system and the like. A detailed description is now given of the data collection system and the like according to an embodiment of the present invention.

Figure 1:
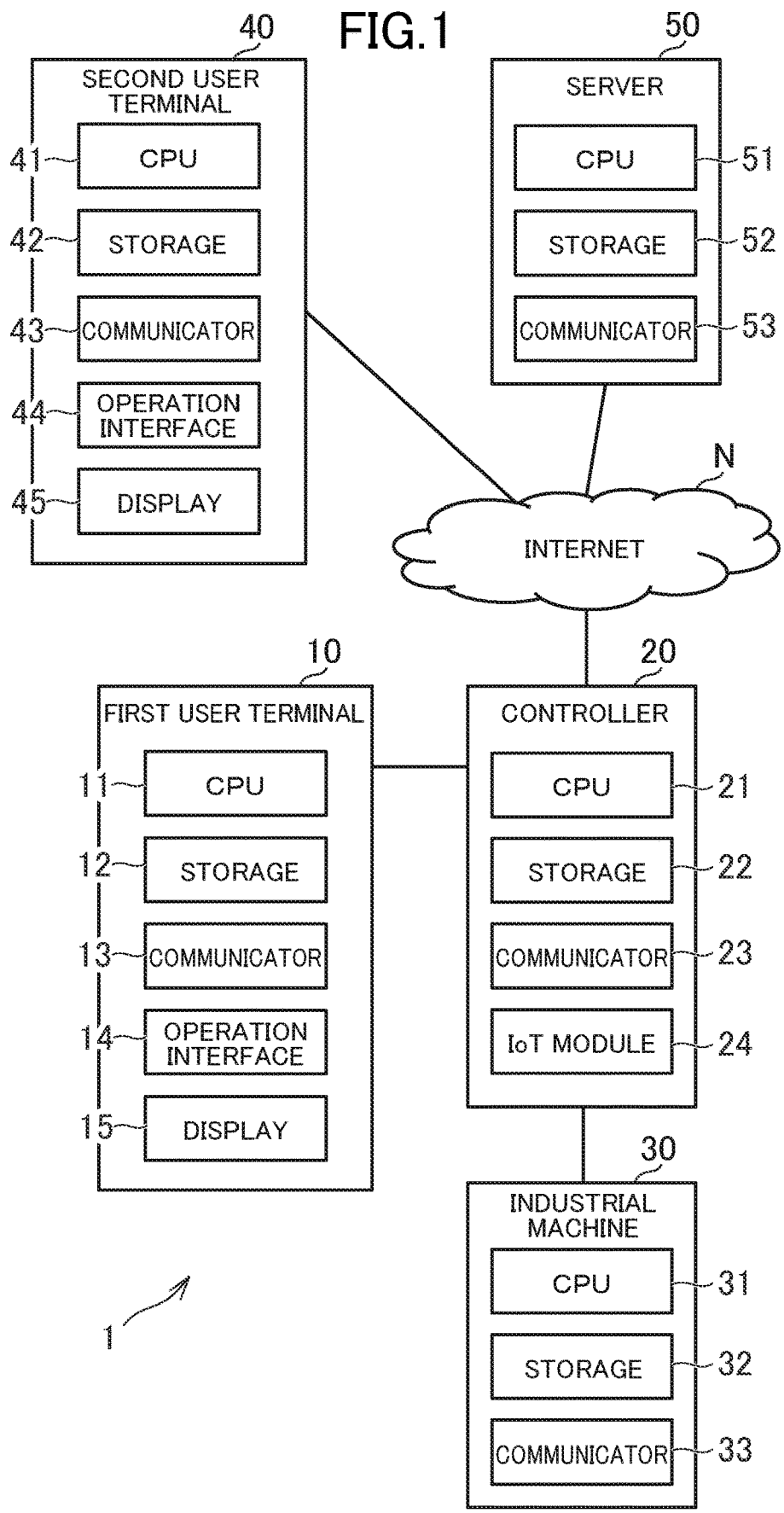
FIG. 1 is a diagram for illustrating an example of an overall configuration of a data collection system.

FIG. 1 is a diagram for illustrating an example of an overall configuration of the data collection system according to the embodiment of the present invention. As illustrated in FIG. 1, a data collection system 1 includes a first user terminal 10, a controller 20, an industrial machine 30, a second user terminal 40, and a server 50. Each of those components is communicatively connected to each other. In this embodiment, each of the first user terminal 10, the controller 20, and the industrial machine 30 is connected to any network, such as an Ethernet (trademark) or a dedicated communication standard. Each of the controller 20, the second user terminal 40, and the server 50 is connected to the Internet N.

The first user terminal 10 is a computer to be operated by a first user. The first user is a user (intermediate user) of at least one of the controller 20 and the industrial machine 30. For example, the first user is an engineer working at a machine manufacturer or a maintenance person at a facility in which the controller 20 and the industrial machine 30 operate. The first user may manage both the controller 20 and the industrial machine 30, or may manage only one of the controller 20 and the industrial machine 30. That is, the user of the controller 20 and the user of the industrial machine 30 may be the same or different. For example, the first user operates the first user terminal 10 to create a program for at least one of the controller 20 and the industrial machine 30, set parameters for at least one of the controller 20 and the industrial machine 30, or perform recovery work in the event of an abnormality.

For example, the first user terminal 10 is a personal computer, a cellular phone (including a smartphone), or a mobile terminal (including a tablet terminal). The first user terminal 10 includes a CPU 11, a storage 12, a communicator 13, an operation interface 14, and a display 15.

The CPU 11 includes at least one processor. The storage 12 includes a RAM or a hard disk drive, and is configured to store various programs and data. The CPU 11 is configured to execute various types of processing based on those programs and data. The communicator 13 includes a network card and a communication interface, for example, various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The controller 20 is a computer configured to control at least one industrial machine 30. The controller 20 is an example of a control device in the embodiment of the present invention. Therefore, the term "controller 20" as used herein can be read as "control device". The controller 20 may be any computer capable of controlling another device. For example, the controller 20 may be a programmable logic controller (PLC) or a computer referred to by another name having a function equivalent to that of a PLC. Further, for example, the controller 20 may be a motor controller, a robot controller, or the like. The overall data collection system 1 may be referred to as "cell", which is a unit smaller than a line. In this case, the controller 20 may be referred to as "cell controller".

The controller 20 includes a CPU 21, a storage 22, a communicator 23, and an Internet-of-Things (IoT) module 24. The physical configuration of each of the CPU 21, the storage 22, and the communicator 23 may be the same as that of the CPU 11, the storage 12, and the communicator 13, respectively.

The IoT module 24 is an integrated circuit for transmitting data to another computer via a network, for example, the Internet N. For example, the IoT module 24 may include a CPU, a storage, and a communicator having the same functions as those of the CPU 21, the storage 22, and the communicator 23, respectively. In place of a general-purpose processor, for example, a CPU, the IoT module 24 may have a dedicated circuit created in order to execute specific processing. For example, each of the CPU 21, the storage 22, and the communicator 23 is mainly used to control the industrial machine 30, and the IoT module 24 is mainly used to collect data. When each of the CPU 21, the storage 22, and the communicator 23 has a data collection function, the IoT module 24 may be omitted.

The industrial machine 30 is a device configured to execute a process determined in advance. The industrial machine 30 can also be referred to as "controlled device" to be controlled by the controller 20 or as a "managed device" to be managed by the controller 20. The industrial machine 30 may be any type of machine, and is, for example, a robot controller, an industrial robot, a motor controller, a machine tool, a press machine, or a conveyance machine. The PLC is also a type of industrial machine. The industrial machine 30 includes a CPU 31, a storage 32, and a communicator 33. The physical configuration of each of the CPU 31, the storage 32, and the communicator 33 may be the same as that of the CPU 11, the storage 12, and the communicator 13, respectively.

The industrial machine 30 may also include other physical components. For example, the industrial machine 30 may include an integrated circuit for a specific application, which is referred to as "ASIC". Any physical component may be connected to the industrial machine 30. For example, a machine to be controlled, such as a motor or the like, a sensor for detecting an operation of a motor, a camera for photographing a state of a workpiece to be processed, an input/output device, or another industrial machine may be connected. The number of industrial machines 30 to be controlled by the controller 20 may be any number. For example, the controller 20 may control only one device, or may control two or more devices.

The second user terminal 40 is a computer to be operated by a second user. The second user is a person who collects data. The second user is the end user of the data collection system 1. For example, the second user is a person at a company who is responsible for collecting and analyzing data. For example, the second user manages the collected data and analyzes the data. In this embodiment, the second user is a user different from the first user. For example, the company of the first user and the company of the second user are different.

For example, the second user terminal 40 is a personal computer, a cellular phone (including a smartphone), or a mobile terminal (including a tablet terminal). The second user terminal 40 includes a CPU 41, a storage 42, a communicator 43, an operation interface 44, and a display 45. The physical configuration of each of the CPU 41, the storage 42, the communicator 43, the operation interface 44, and the display 45 may be the same as that of the CPU 11, the storage 12, the communicator 13, the operation interface 14, and the display 15, respectively.

The server 50 is a server computer. The server 50 includes a CPU 51, a storage 52, and a communicator 53. The physical configuration of each of the CPU 51, the storage 52, and the communicator 53 may be the same as that of the CPU 11, the storage 12, and the communicator 13, respectively. The server 50 is configured to manage the data collected by the controller 20 and to analyze an operation of the industrial machine 30 based on the data. In this embodiment, the server 50 is under the control of the second user.

The programs and data described as being stored in each of the storages 12, 22, 32, 42, and 52 may be supplied through the network. Moreover, the hardware configuration of each device is not limited to the above-mentioned example, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

2. Outline of Data Collection System

In this embodiment, the controller 20 is configured to store a control program for controlling the industrial machine 30. For example, when the industrial machine 30 executes a plurality of processes in a predetermined order, the control program describes the execution order of each process. Further, for example, when a plurality of industrial machines 30 operate in a predetermined order, the control program describes the operation order of each industrial machine 30. The controller 20 transmits an instruction to the industrial machine 30 based on the control program. The industrial machine 30 stores a device program for executing a process and a variable in association with each other. The industrial machine 30 receives the instruction from the controller 20, and executes the device program based on the value of the variable.

The "process" is a task or an operation to be performed by the industrial machine 30. The process may be composed of only one task, or may be composed of a combination of a plurality of tasks. The process may have any content in accordance with the use of the industrial machine 30. For example, the process is recognition of a workpiece, gripping of a workpiece, opening/closing of a door, setting of a workpiece, or machining using a machine tool. The industrial machine 30 performs at least one process. The number of processes to be performed by the industrial machine 30 may be any number. The industrial machine 30 may perform only one process or may perform a plurality of processes.

The device program is a program defining an operation of the industrial machine 30. In the device program, each procedure of each process is defined. The device program can be created in any language in accordance with the industrial machine 30, and is created in, for example, a ladder language or a robot language. In this embodiment, a device program is prepared for each process. Therefore, when a certain industrial machine 30 is to perform n-number (n is a natural number) of processes, the industrial machine 30 stores at least n-number of device programs.

The variable is information serving as an execution condition of a process. For example, the industrial machine 30 stores a variable for starting the process, a variable for temporarily stopping the process, or a variable for ending the process. Variables may also be referred to as "input/output variables". Each variable is stored in a specific register of the storage 32 of the industrial machine 30. It is assumed that the relationship between each variable and each register (which variable is stored in which register) is specified in advance by the creator of the device program. The variables stored in the registers can be referred to as appropriate by another device (for example, the controller 20).

In this embodiment, in addition to the variables serving as execution conditions of the process, the industrial machine 30 also stores various other variables such as a variable indicating an intermediate calculation result, or a variable indicating a physical quantity detected by a sensor (for example, a torque value detected by a torque sensor or a motor rotation speed detected by an encoder). Among those variables, there are variables that are preferably not shared with the second user. For example, it is preferred not to disclose to the second user a variable to be hidden as know-how of the first user or a variable that may cause the industrial machine 30 to malfunction when handled by a second user who is not familiar with the device program.

Therefore, the data collection system 1 of this embodiment is configured such that a sharable public variable is set from among a plurality of variables of the industrial machine 30. For example, when the first user operates the first user terminal 10 to create a control program and a device program and define a plurality of variables of the industrial machine 30, the first user sets, from among the plurality of variables, the public variables sharable to the second user.

Figure 2:
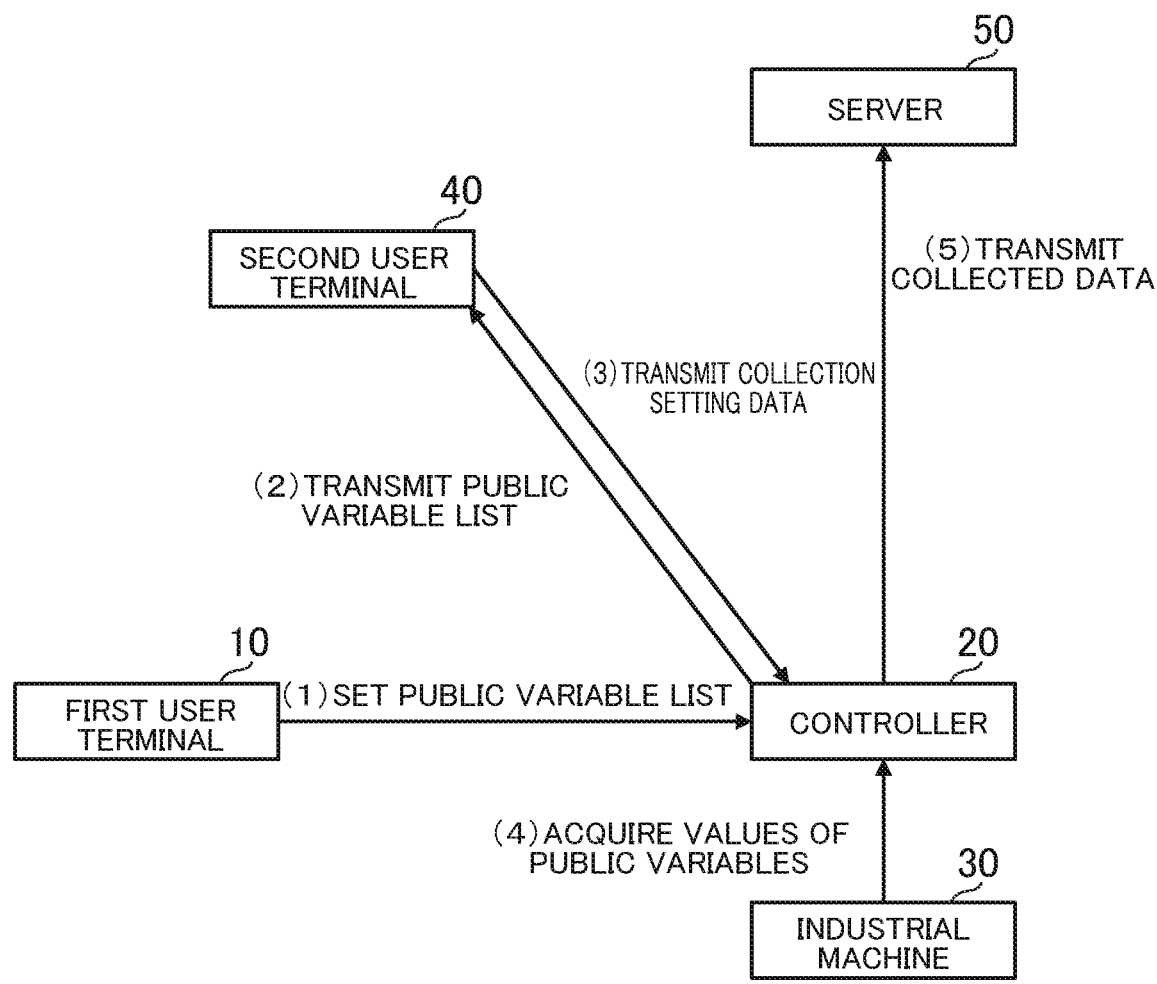
FIG. 2 is a diagram for illustrating how public variables are set in the data collection system.

FIG. 2 is a diagram for illustrating how the public variables are set in the data collection system 1. As indicated by Step (1) of FIG. 2, the first user creates a public variable list by operating the first user terminal 10 to specify the public variables sharable to the second user, and sets the list in the controller 20. The first user can set any variable as a public variable from among the plurality of variables of the industrial machine 30. The first user may set all the variables as public variables, but in this embodiment, the user sets only a part of the variables as public variables. The public variable list is stored in the controller 20.

As indicated by Step (2) of FIG. 2, the controller 20 transmits the public variable list to the second user terminal 40. When the second user terminal 40 receives the public variable list, the second user operates the second user terminal 40 to select the public variables to be collected (data collection targets). The second user may select all the public variables indicated in the public variable list as data collection targets, or may select only a part of those public variables as data collection targets.

As indicated by Step (3) of FIG. 2, the second user terminal 40 transmits to the controller 20 collection setting data indicating the public variables selected by the second user. When the controller 20 receives the collection setting data, the controller 20 stores the collection setting data in the IoT module 24. Data collection is then possible from that point on based on the public variables selected by the second user.

In this embodiment, there is described a case in which the CPU 21 of the controller 20 acquires all the public variables from the industrial machine 30, and the public variables to be transmitted to the server 50 are narrowed down by the IoT module 24. Therefore, as indicated by Step (4) of FIG. 2, the CPU 21 of the controller 20 acquires the values of all public variables from the industrial machine 30, and records the acquired values in the storage 22. The values of the public variables recorded in the storage 22 are copied to the IoT module 24. The IoT module 24 narrows down the values of the public variables selected by the second user from among the public variables copied to the IoT module 24 based on the collection setting data.

As indicated by Step (5) of FIG. 2, the IoT module 24 of the controller 20 collects data on the industrial machine 30 based on the values of the public variables selected by the second user, and transmits the data to the server 50 at any timing. When the server 50 receives the data, the server accumulates the data in a database. The data accumulated in the database can be used for any purpose. For example, the data may be used for analysis by the second user, or may be used for recovery when an abnormality has occurred in the industrial machine 30.

As described above, the data collection system 1 transmits to the second user a public variable list indicating the public variables set by the first user. The data collection system 1 collects data on the industrial machine 30 based on the public variables selected by the second user from the public variable list, and accumulates the data in the server 50. As a result, the second user is allowed to collect only the values of the public variables selected by the second user, and the second user is prevented from collecting the values of variables not set as public variables. The data collection system 1 is now described in more detail.

3. Functions to be Implemented in Data Collection System

Figure 3:
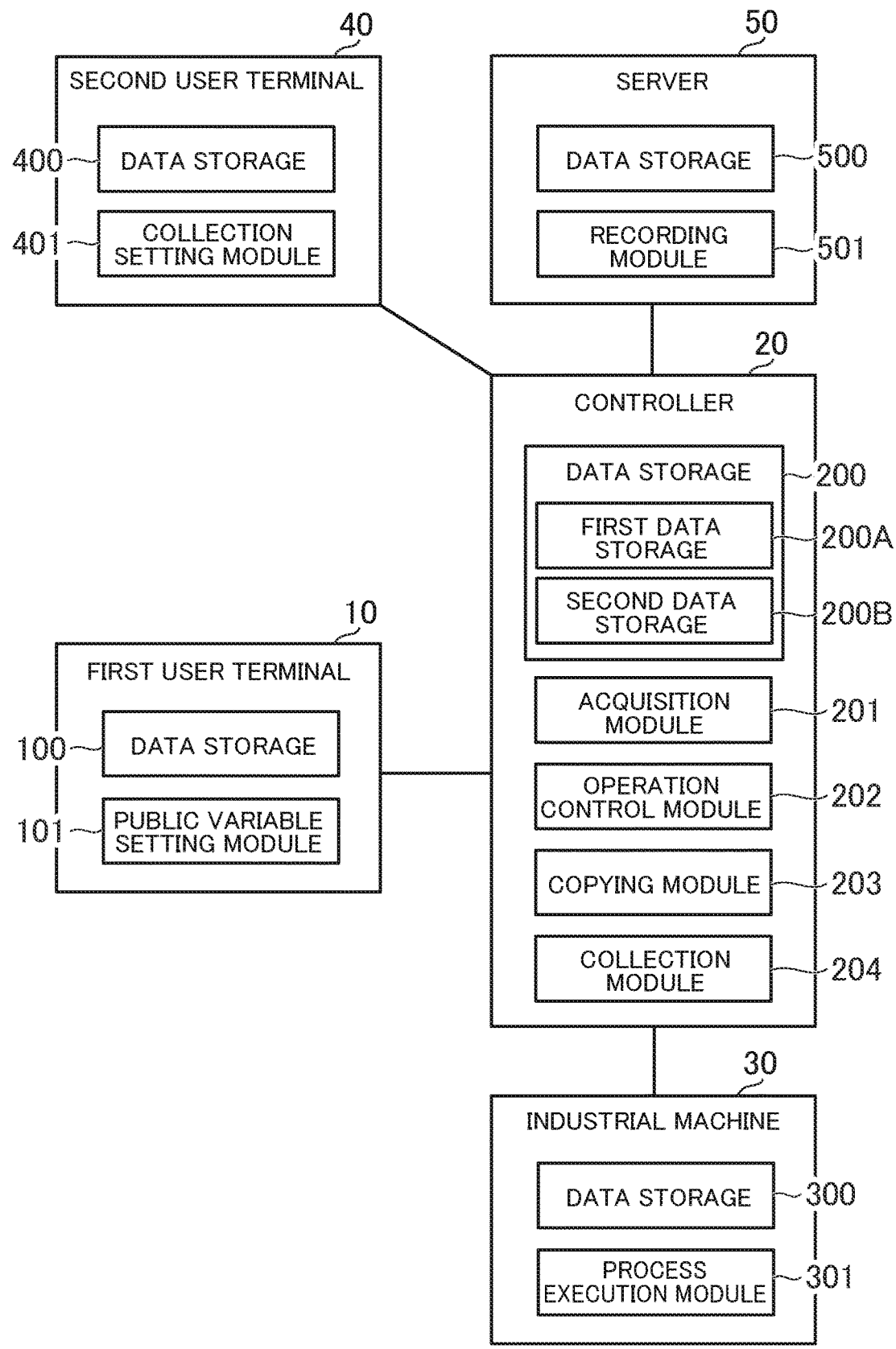
FIG. 3 is a functional block diagram for illustrating functions to be implemented in the data collection system.

FIG. 3 is a functional block diagram for illustrating functions to be implemented in the data collection system 1. In this embodiment, functions to be implemented in each of the first user terminal 10, the controller 20, the industrial machine 30, the second user terminal 40, and the server 50 are described.

3-1. Functions to be Implemented in First User Terminal

As illustrated in FIG. 3, in the first user terminal 10, a data storage 100 and a public variable setting module 101 are implemented.

Data Storage

The data storage 100 is mainly implemented by the storage 12. The data storage 100 is configured to store the data set for each of the controller 20 and the industrial machine 30. For example, the data storage 100 stores the control program, the device program, the public variable list, and register information.

In this embodiment, the industrial machine 30 executes the device program based on a variable, and thus the control program is a program for controlling the value of the variable associated with the device program. For example, when causing the industrial machine 30 to execute a plurality of processes one after another, the control program describes an instruction for changing the value of the variable associated with the device program of each process. Further, for example, when the end of a given device program is a condition for starting another device program, the fact that the variable indicating the end of the given device program changes to a predetermined value is described in the control program as a condition for starting the another device program. When variables are not particularly used for controlling a process, the control program may be created in a known language such as a ladder language or a robot language. For example, the first user uses an engineering tool installed in the first user terminal 10 to create the control program.

In this embodiment, the device program is executed based on a variable, and thus the data storage 100 also stores a setting of the variable associated with the device program. A variable having any content can be set. For example, a "start" variable for starting the device program, an "end" variable indicating the end of the device program, an "abort" variable indicating that an abnormality has occurred during the execution of the device program, and a "busy" variable indicating a busy state can be set. For example, the first user uses an engineering tool installed in the first user terminal 10 to create the device program and set the variables. As described above, the device program may be created in a known language such as a ladder language or a robot language.

Figure 4:
FIG. 4 is a table for showing a data storage example of a public variable list.

FIG. 4 is a table for showing a data storage example of the public variable list. As shown in FIG. 4, a public variable list L includes information for identifying the variables specified as public variables. For example, the public variable list L stores the name of each variable specified as a public variable and a comment about each of those variables. The name of the variable is an example of information for identifying the variable. The variable may also be identified based on information other than a name, for example, an ID. The comment is any string of characters input by the first user. The comment shows information such as the content and purpose of the variable. The public variable list L is not limited to the example of FIG. 4, and may store a list of all the variables and a flag indicating whether or not each variable is a public variable. In this case, the flag value is specified by the first user.

Figure 5:
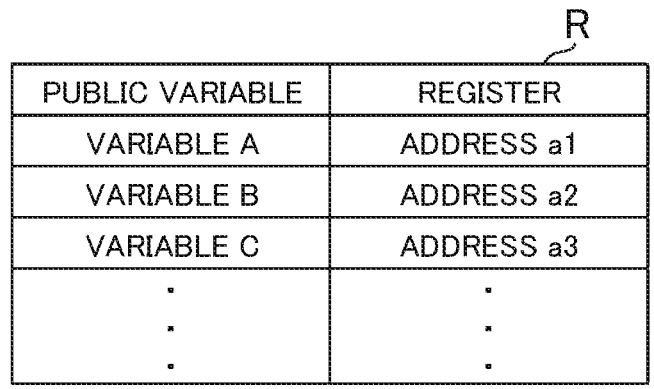
FIG. 5 is a table for showing a data storage example of register information.

FIG. 5 is a table for showing a data storage example of the register information. As shown in FIG. 5, register information R indicates a register (address) storing each of the plurality of variables of the industrial machine 30. For example, the register information R indicates, for each variable, the address of the register in which the value of the variable is stored. The register information R may show the register of all the variables of the industrial machine 30, or may show only the register of a part of the variables. For example, the register information R may include only the registers of the public variables. For example, when creating the device program, for example, the first user specifies a correspondence relationship between the variables and the registers to create the register information.

The data to be stored in the data storage 100 is not limited to the example described above. For example, the data storage 100 may store an engineering tool for the first user to create a program and perform various setting operations. Further, for example, the data storage 100 may store code information on a control program or a device program that is being created.

Public Variable Setting Module

The public variable setting module 101 is mainly implemented by the CPU 11. The public variable setting module 101 is configured to set the sharable public variables from among the plurality of variables of the industrial machine 30 controlled by the controller 20. "Setting a public variable" means determining a public variable from among a plurality of variables. In other words, recording information for identifying a variable specified as a public variable in a computer, for example, the controller 20, corresponds to setting a public variable. In this embodiment, creating the public variable list L corresponds to setting a public variable.

For example, the public variable setting module 101 sets the public variables specified by the first user, who is the user of at least one of the controller 20 and the industrial machine 30. The public variable setting module 101 stores information for identifying the public variables specified by the first user in the public variable list L. When identifying the public variables based on a flag value, the public variable setting module 101 determines the flag value of public variables specified by the first user. Further, the public variables may be specified by a person other than the first user. For example, the public variables may be already specified at the time of manufacturing the industrial machine 30.

3-2. Functions to be Implemented in Controller

As illustrated in FIG. 3, in the controller 20, a data storage 200, an acquisition module 201, an operation control module 202, a copying module 203, and a collection module 204 are implemented.

Data Storage

The data storage 200 is mainly implemented by the storage 22 and the IoT module 24. The data storage 200 is configured to store the data required for control of the industrial machine 30, data collection, and transmission of the collected data. In this embodiment, the data storage 200 includes a first data storage 200A and a second data storage 200B. The first data storage 200A is mainly implemented by the storage 22, and the second data storage 200B is mainly implemented by the IoT module 24.

The first data storage 200A mainly stores the data required for control of the industrial machine 30. For example, the first data storage 200A stores a control program, a public variable list L, register information R, and variable value data. The control program, the public variable list L, and the register information R of the first data storage 200A are the same as the control program, the public variable list L, and the register information R of the data storage 100, respectively. In this embodiment, the control program, public variable list L, and register information R created by the first user are written in the first data storage 200A.

FIG. 6 is a table for showing a data storage example of variable value data D1. As shown in FIG. 6, the variable value data D1 is data indicating current values of the public variables. For example, the variable value data D1 indicates the current value for each public variable. The variable value data D1 is updated based on processing of the acquisition module 201 described later. In addition, the variable value data D1 may store the current values of variables other than the public variables.

The second data storage 200B mainly stores the data required for data collection. For example, the second data storage 200B stores the variable value data D1 and collection setting data. The variable value data D1 is the same as the variable value data D1 stored in the first data storage 200A, and is copied by the copying module 203 described later.

Figure 7:
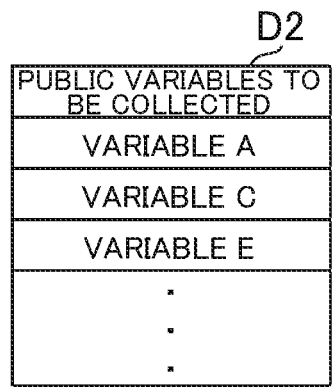
FIG. 7 is a table for showing a data storage example of collection setting data.

FIG. 7 is a table for showing a data storage example of the collection setting data. As shown in FIG. 7, collection setting data D2 is data indicating the collection setting specified by the second user. In this embodiment, there is described a case in which the type of each public variable to be collected corresponds to the collection setting. For example, the collection setting data D2 includes information for identifying the public variables specified as collection targets by the second user. The collection setting data D2 is acquired from the second user terminal 40 and recorded in the second data storage 200B. Therefore, the collection setting data D2 of the second data storage 200B is the same as the collection setting data D2 of a data storage 400 described later.

The data storage 200 is not required to be divided into the first data storage 200A and the second data storage 200B. For example, when the CPU 21 executes not only the control of the industrial machine 30 but also the processing for data collection, and the IoT module 24 is omitted, the second data storage 200B may be omitted. In this case, the data described as being stored in the second data storage 200B may be stored in the first data storage 200A.

Acquisition Module

The acquisition module 201 is mainly implemented by the CPU 21. The acquisition module 201 is configured to acquire the values of the public variables from the industrial machine 30. In this embodiment, the register corresponding to each public variable is shown in the register information R, and thus the acquisition module 201 acquires the value of each public variable from the industrial machine 30 based on the register information R indicating the relationship between the public variables and the registers of the industrial machine 30.

The acquisition module 201 transmits to the industrial machine 30 a request to read out the register associated with the public variable. When the industrial machine 30 receives the read request, the industrial machine 30 reads out a target register and transmits the target register to the controller 20. The acquisition module 201 records the value of the public variable received from the industrial machine 30 in the data storage 200. In this embodiment, there is described a case in which the acquisition module 201 acquires the values of the public variables regularly (periodically), but the acquisition module 201 may acquire the values of the public variables irregularly (aperiodically).

Further, in this embodiment, there is described a case in which the correspondence relationship between the variables and the registers is managed by the controller 20, but it is not required that those correspondence relationships be managed by the controller 20. In this case, the correspondence relationship between the variables and the registers is managed by the industrial machine 30, and the acquisition module 201 may transmit to the industrial machine 30 information for identifying the variable for which a value is to be acquired. The industrial machine 30 may read out the register corresponding to the variable indicated by the information received from the controller 20, and transmit the value to the controller 20.

Operation Control Module

The operation control module 202 is mainly implemented by the CPU 21. The operation control module 202 is configured to control the operation of the industrial machine 30 based on the control program. For example, the operation control module 202 transmits an instruction to the industrial machine 30, and the industrial machine 30 operates based on the instruction. In this embodiment, the industrial machine 30 operates based on the values of the variables associated with the device program, and thus the operation control module 202, for example, transmits to the industrial machine 30 an instruction to change the value of the variable for starting the device program, and the industrial machine 30 changes the value of the variable based on the instruction and executes the device program. In addition, when variables are not particularly used for controlling the operation of the industrial machine 30, the operation control module 202 may control the operation of the industrial machine 30 by transmitting a command indicating the operation to be executed by the industrial machine 30.

The public variables may be used for operation of the industrial machine 30, and thus the operation control module 202 acquires the values of the public variables from the industrial machine 30, records the acquired values in the data storage 200, and controls the industrial machine 30 based on the values of the public variables. For example, in a case where a certain device program is executed and then another device program is executed, when the value of the public variable indicating the end of the certain device program reaches a predetermined value, the operation control module 202 instructs the industrial machine 30 to execute the another device program. As another example, the operation control module 202 may instruct the industrial machine 30 to stop operation when a public variable indicating that an abnormality has occurred in the device program reaches a predetermined value.

Copying Module

The copying module 203 is mainly implemented by the IoT module 24. The copying module 203 is configured to copy the values of the public variables recorded in the first data storage 200A of the controller 20 to another second data storage 200B. In this embodiment, there is described a case in which the copying module 203 copies the values of the public variables regularly (periodically), but the acquisition module 201 may copy the values of the public variables irregularly (aperiodically). The period in which the acquisition module 201 acquires the public variables and the period in which the copying module 203 copies the public variables may be the same or different.

The value of each public variable is indicated in the variable value data D1, and thus the copying module 203 copies the variable value data D1 recorded in the first data storage 200A as it is to the second data storage 200B. Therefore, the variable value data D1 of the second data storage 200B is replaced (overwritten) with the latest variable value data D1 of the first data storage 200A. The copying module 203 may copy only a part of the contents of the variable value data D1 stored in the first data storage 200A. For example, the copying module 203 may copy only the values of the public variables that are collection targets.

Collection Module

The collection module 204 is mainly implemented by the IoT module 24. The collection module 204 is configured to collect data on the industrial machine 30 based on public variables. The data on the industrial machine 30 is data on the operation of the industrial machine 30, and is data in which the values of the public variables are stored. The data is hereinafter referred to as "collection data". The values of the public variable at a certain point in time may be stored in the collection data, or a time-series change of the values of the public variables may be stored in the collection data. Further, the value of only one public variable may be stored in the collection data, or the values of a plurality of public variables may be stored in the collection data. As another example, a value calculated based on the values of a plurality of public variables may be stored in the collection data.

"Collecting the collection data" means obtaining the values of the public variables to be stored in the collection data. In other words, "collecting the collection data" means creating the collection data based on the values of the public variables. The collection module 204 collects the collection data based on the values of the public variables recorded in the data storage 200 of the controller 20.

In this embodiment, the collection setting is specified by the second user, and thus the collection module 204 collects the collection data based on the public variables and the collection setting. For example, the types of public variables to be collected are indicated in the collection setting data D2, and hence the collection module 204 collects the collection data based on the values of the public variables having the types indicated in the collection setting data D2. That is, the collection module 204 does not store, in the collection data, the values of public variables not indicated in the collection setting data D2. Public variables not indicated in the collection setting data D2 are excluded from the data to be collected.

In this embodiment, data collection is performed after the variable value data D1 of the first data storage 200A is copied to the second data storage 200B, and thus the collection module 204 collects the collection data based on the values of the public variables copied to the second data storage 200B of the controller 20. That is, the collection module 204 collects the collection data based on the variable value data D1 of the second data storage 200B copied from the first data storage 200A, and not based on the variable value data D1 of the first data storage 200A for controlling the industrial machine 30.

In this embodiment, each of the controller 20 and the industrial machine 30 is connected to a network enabling synchronous communication, and the collection module 204 transmits the collection data based on a network different from the network to which the controller 20 and the industrial machine 30 are connected. "Synchronous communication" refers to a communication method in which, as a general rule, no other processing is performed between transmission of a command and reception of a response. The network capable of performing synchronous communication is only required to have an environment for performing synchronous communication, and it is not required that synchronous communication be always being performed. In particular, depending on the type of the industrial machine 30, the industrial machine 30 may be connected to a network that does not require synchronous communication.

The controller 20 and the industrial machine 30 are connected by a so-called field network. On the other hand, the controller 20 and the server 50 may be connected by a network different from the field network. For example, the controller 20 and the server 50 may be connected by the general Internet or may be connected by a LAN. In other words, the controller 20 and the industrial machine 30 are connected by a network having a first communication protocol (for example, a communication protocol dedicated to the industrial machine 30), and the controller 20 and the server 50 are connected by a network having a second communication protocol different from the first communication protocol.

In this embodiment, the acquisition module 201 acquires the values of public variables based on the register information R, and thus the collection module 204 collects the collection data based on the values of the public variables acquired by the acquisition module 201. The collection module 204 may collect the collection data based on all the values of the public variables acquired by the acquisition module 201, or may collect the collection data based on a part of the values of the public variables.

In this embodiment, the collection data is transmitted to the second user, and thus the collection module 204 transmits the collected collection data to the second user, who is a different user from the first user. "Transmitting the collection data to the second user" means transmitting the collection data to a computer managed by the second user. In this embodiment, the collection module 204 transmits the collection data to the server 50, but the collection module 204 may transmit the collection data to another computer, for example, the second user terminal 40. The collection data may be transmitted by any method. For example, the collection data may also be transmitted as an attachment to an electronic mail, or by using FTP, for example.

3-3. Functions to be Implemented in Industrial Machine

As illustrated in FIG. 3, in the industrial machine 30, a data storage 300 and a process execution module 301 are implemented.

Data Storage

The data storage 300 is mainly implemented by the storage 32. The data storage 300 is configured to store the data required for the industrial machine 30 to perform a predetermined operation. For example, the data storage 300 stores a device program and the current values of the public variables. The device program is the same as the device program stored in the data storage 100. The current values of the public variables are the same as the values stored in the variable value data D1. The data storage 300 also stores the values of variables other than public variables. The value of each variable is stored in a register determined in advance.

Process Execution Module

The process execution module 301 is mainly implemented by the CPU 31. The process execution module 301 is configured to execute a predetermined process based on the device program stored in the data storage 300 and an instruction received from the controller 20. For example, when the controller 20 is to start a certain device program, the controller 20 transmits to the industrial machine 30 an instruction to set a variable associated with the device program to a predetermined value. When the industrial machine 30 receives the instruction, the industrial machine 30 changes the variable to a predetermined value. When the process execution module 301 detects that the variable has been changed to the predetermined value, the process execution module 301 executes the device program associated with the variable.

When the process indicated by the device program ends, the process execution module 301 changes the variable associated with the device program to a predetermined value, and transmits the fact to the controller 20. Then, when executing another device program, the controller 20 transmits to the industrial machine 30 an instruction to set the variable associated with the another device program to a predetermined value, and the process execution module 301 executes the another device program. When the execution order of a plurality of device programs is defined in the industrial machine 30, it is not required to transmit the end of the device program to the controller 20, and the process execution module 301 may execute the plurality of device programs one after another.

3-4. Functions to be Implemented in Second User Terminal

As illustrated in FIG. 3, in the second user terminal 40, a data storage 400 and a collection setting module 401 are implemented.

Data Storage

The data storage 400 is mainly implemented by the storage 42. The data storage 400 is configured to store the data required for executing data collection. For example, the data storage 400 stores a public variable list L and collection setting data D2. The public variable list L is the same as the public variable list L of each of the data storage 100 and the second data storage 200B. The collection setting data D2 is the same as the collection setting data D2 of the second data storage 200B. When the public variable list L is updated by the first user, the updated public variable list L is transmitted to the second user terminal 40. On the other hand, when the collection setting data D2 is updated by the second user, the updated collection setting data D2 is transmitted to the controller 20.

Collection Setting Module

The collection setting module 401 is mainly implemented by the CPU 41. The collection setting module 401 is configured to perform a collection setting relating to the data based on the public variables. The collection setting is a condition at the time of data collection. In this embodiment, the types of public variables to be collected are specified as the collection setting. For example, the collection setting module 401 sets, from among the plurality of public variables indicated in the public variable list L, the types of public variables to be collected. The contents of the collection setting are indicated in the collection setting data D2, and thus the collection setting module 401 performs the collection setting by creating the collection setting data D2, and transmitting the created collection setting data D2 to the controller 20. That is, the collection setting module 401 sets the controller 20 so as to collect data based on the collection setting data D2.

3-5. Functions to be Implemented in Server

As illustrated in FIG. 3, in the server 50, a data storage 500 and a recording module 501 are implemented.

Data Storage

The data storage 500 is mainly implemented by the storage 52. The data storage 500 is configured to store a collection database obtained by accumulating the collection data. The collection database is a database in which the collection data received by the server 50 has been accumulated. When the collection data is received from the controller 20, the server 50 stores the received collection data in the collection database. Therefore, a history of the collection data collected in the past is stored in the collection database.

Recording Module

The recording module 501 is mainly implemented by the CPU 51. The recording module 501 is configured to record the collection data in the data storage 500. The recording module 501 stores the collection data received by the server 50 from the controller 20 in the collection database. In this embodiment, the collection data is transmitted to the second user, who is a user different from the first user, and thus the recording module 501 records the collection data transmitted to the second user, who is different from the first user, in the data storage 500.

4. Processing to be Executed in Data Collection System

Figure 8:
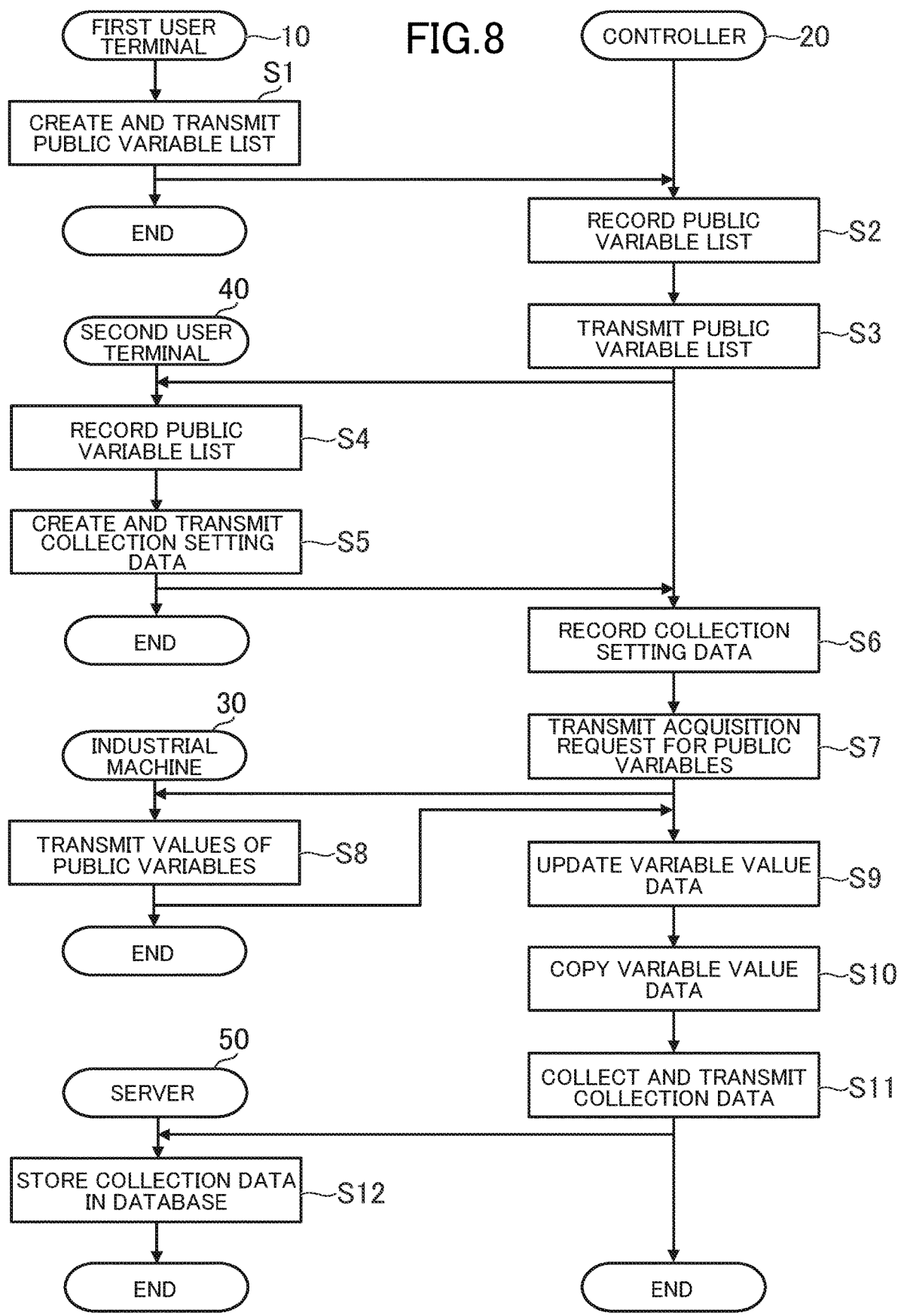
FIG. 8 is a flowchart for illustrating an example of processing to be executed in the data collection system.

FIG. 8 is a flowchart for illustrating an example of processing to be executed in the data collection system 1. The processing illustrated in FIG. 8 is executed by each of the CPUs 11, 21, 31, 41, and 51 operating in accordance with programs stored in the storages 12, 22, 32, 42, and 52. The processing illustrated in FIG. 8 is an example of the processing executed by the functional blocks illustrated in FIG. 3. In the execution of the processing illustrated in FIG. 8, it is assumed that the control program, the device program, and the register information R have been created in advance. Further, in FIG. 8, processing relating to data collection is mainly described, and processing of controlling the industrial machine 30 by the controller 20 is omitted.

As illustrated in FIG. 8, first, the first user terminal 10 creates the public variable list L based on an operation of the first user, and transmits the public variable list L to the controller 20 (Step S1). In Step S1, the first user terminal 10 displays all the variables of the industrial machine 30 on the display 15. It is assumed that information for identifying the variables of the industrial machine 30 has been stored in the storage 12 in advance. The first user operates the operation interface 14 to specify public variables from among the variables displayed on the display 15, and inputs comments as required. The first user terminal 10 generates the public variable list L including the public variables specified by the user and the comments input by the user. The comments may also be stored in the storage 12 in advance in association with the variables.

When the controller 20 receives the public variable list L, the controller 20 records the public variable list L in the storage 22 (Step S2), and transmits the public variable list L to the second user terminal 40 (Step S3). In this embodiment, there is described a case in which the controller 20 transmits the public variable list L to the second user terminal 40, but the first user terminal 10 may transmit the public variable list L to the second user terminal 40.

When the second user terminal 40 receives the public variable list L, the second user terminal 40 records the public variable list L in the storage 42 (Step S4), creates the collection setting data D2 based on an operation of the second user, and transmits the collection setting data D2 to the controller 20 (Step S5). In Step S5, the second user terminal 40 displays the contents of the public variable list L on the display 45, and receives a selection by the second user. The second user terminal 40 creates the collection setting data D2 indicating the public variables selected as collection targets by the second user, and transmits the collection setting data D2 to the controller 20.

When the controller 20 receives the collection setting data D2, the controller 20 records the collection setting data D2 in the IoT module 24 (Step S6). When the collection setting data D2 has been recorded, the data can be collected from the industrial machine 30.

The controller 20 transmits a public variable acquisition request to the industrial machine 30 based on the register information R stored in the storage 22 (Step S7). In Step S7, an acquisition request for all the public variables is transmitted regardless of the public variables indicated in the collection setting data D2. For example, the controller 20 identifies the registers of all the public variables by referring to the register information R, and transmits a request to read out each register.

When the industrial machine 30 receives the public variable acquisition request, the industrial machine 30 transmits to the controller 20 the values of the public variables recorded in the storage 32 (Step S8). In Step S8, the industrial machine 30 refers to the registers of the addresses included in the public variable acquisition request, and transmits a data set of the values stored in the registers.

The controller 20 updates the variable value data D1 of the storage 22 based on the values of the public variables acquired from the industrial machine 30 (Step S9), and copies the variable value data D1 of the storage 22 to the IoT module 24 (Step S10). In Step S9, the controller 20 updates the variable value data D1 of the storage 22 such that the values of the public variables are the latest values, and copies the updated variable value data D1 to the IoT module 24.

The controller 20 collects, based on the collection setting data D2, the values of the public variables to be collected from among the variable value data D1 copied to the IoT module 24, and transmits the collection data to the server 50 (Step S11). In Step S11, from among the public variables stored in the variable value data D1, the controller 20 creates the collection data based on the values of the public variables to be collected specified by the second user, and transmits the created collection data to the server 50.

The server 50 receives the collection data, stores the received collection data in the collection database (Step S12), and this processing ends. In Step S12, the server 50 adds the received collection data to the collection database.

According to the data collection system 1 described above, from among the plurality of variables of the industrial machine 30 controlled by the controller 20, the sharable public variables can be set, and the collection data on the industrial machine 30 can be collected and recorded based on the sharable public variables. Further, the know-how of the developer of the industrial machine 30 can be prevented from being leaked to a third party by excluding from public variables the variables that the developer wants to keep secret as know-how. In addition, it is possible to prevent the collection of non-required data by narrowing down the public variables for which collection data is to be collected. As a result, the amount of recorded data is reduced, and hence memory consumption can be reduced. Moreover, non-required collection data is not transmitted, and thus the communication load can be reduced. Further, non-required data is not collected, and thus the processing load on the data collection system 1 can be reduced.

Further, the data collection system 1 can increase the convenience of data collection by performing a collection setting relating to the collection data based on the public variables, and collecting the collection data based on the collection setting.

In addition, the data collection system 1 can effectively increase the convenience of data collection by setting the types of public variables that are collection targets, and collecting the collection data based on the set types. For example, it is possible to prevent the collection of non-required data by narrowing down the public variables to be collected. As a result, it is possible to reduce the memory consumption amount, the network communication amount, and the processing load.

In addition, the data collection system 1 can increase the efficiency of data collection by performing data collection by using the values of the public variables recorded by the controller 20 to control the industrial machine 30. For example, when acquisition of the values of the public variables for controlling the industrial machine 30 and acquisition of the values of the public variables for collecting the data are performed separately, the industrial machine 30 is required to execute the same processing in duplicate, and hence the processing load on the industrial machine 30 increases. However, the data collection system 1 can prevent such duplicate processing from occurring. As a result, the processing load on the industrial machine 30 can be reduced.

Further, the data collection system 1 performs data collection based on the values of the public variables copied from the CPU 21 to the IoT module 24, and thus the storage storing the values required for controlling the controller 20 and the storage storing the values required for data collection are different. As a result, it is possible to reduce the possibility of data collection interfering with the control of the industrial machine 30.

In addition, the data collection system 1 can execute data collection without interfering with operation of the industrial machine 30 by performing data collection based on a network different from the network connecting the controller 20 and the industrial machine 30 to each other.

Further, through performing data collection based on the register information R indicating the relationship between the public variables and the registers, the data collection system 1 can collect data even when the person collecting the data does not know the register system. As a result, it is possible to facilitate data collection, to thereby increase the convenience of the collector.

In addition, the data collection system 1 can collect and record the collection data based on the public variables even when the user managing at least one of the controller 20 and the industrial machine 30 and the user collecting the data on the industrial machine 30 are different. As a result, it is possible to prevent collection of information on variables that are not to be shared with a user collecting data.

5. Modification Examples

The present invention is not limited to the embodiment described above, and can be modified suitably without departing from the spirit of the present invention.

(1) For example, in the embodiment, there is described a case in which the types of public variables to be collected are specified as the collection setting, but the information to be specified as the collection setting is not limited to the types of public variables. For example, the collection setting may indicate a collection frequency of the collection data. The collection module 204 in Modification Example (1) of the present invention is configured to collect the collection data based on the collection frequency indicated by the collection setting.

The collection frequency is the frequency in which the collection data is collected, and "collection frequency" can also be referred to as "sampling frequency". For example, as the collection frequency, the second user specifies a time interval for collecting the public variables or the number of collections per unit time. The collection frequency is stored in the collection setting data D2, and the collection module 204 collects the collection data based on the collection frequency indicated in the collection setting data D2. For example, the collection module 204 acquires the values of the public variables and creates the collection data every time indicated by the collection frequency. In Modification Example (1), the acquisition of the values of the public variables by the acquisition module 201 is performed periodically regardless of the collection frequency, but the acquisition module 201 may acquire the values of the public variables in accordance with the collection frequency.

According to Modification Example (1), the convenience of data collection can be effectively increased by setting the collection frequency of the collection data, and collecting the collection data based on the set collection frequency. For example, when a high collection frequency is set, detailed data collection can be performed. As a result, operation analysis of the industrial machine 30 can be performed in detail. Further, for example, when a low collection frequency is set, collection of non-required data can be prevented. As a result, it is possible to reduce the memory consumption amount, the network communication amount, and the processing load.

(2) Further, for example, the collection setting may indicate a data collection start condition, and the collection module 204 may start collecting the collection data based on the start condition indicated by the collection setting. The start condition is a condition for starting collection of the collection data, and any condition can be set. For example, the start condition is the condition that a predetermined date and time has arrived, the condition that execution of a predetermined device program is started, or the condition that the value of a public variable is a predetermined value.

In Modification Example (2) of the present invention, there is described a case in which the value of a certain piece of collection data becoming a predetermined value is the start condition of another piece of collection data. In other words, there is described a case in which, when the collection data collected based on a certain public variable has become a predetermined value, data collection based on another public variable is started. For example, when the collection data indicates a torque value and the torque value has changed, collection of collection data indicating a rotation speed of a motor may be started. In this case, the collection module 204 determines whether or not the torque value indicated by the collection data has changed by a predetermined amount, and when it is determined that the torque value has changed by the predetermined amount, the collection module 204 starts collecting the collection data indicating the rotation speed of the motor.

According to Modification Example (2), the convenience of data collection can be effectively increased by setting a data collection start condition and starting data collection based on the set start condition. Data is not collected until the start condition is satisfied, and thus collection of non-required data can be prevented. As a result, it is possible to reduce the memory consumption amount, the network communication amount, and the processing load.

(3) Further, for example, the collection data accumulated in the server 50 may be used for an operation instruction to the industrial machine 30. FIG. 9 is a functional block diagram of Modification Example (3) of the present invention. As illustrated in FIG. 9, the data collection system 1 of Modification Example (3) includes an operation command transmission module 502. The operation command transmission module 502 is mainly implemented by the CPU 51.

The operation command transmission module 502 is configured to transmit an operation command relating to the industrial machine 30 to the controller 20 based on the collection data. The operation command may be a command for causing the industrial machine 30 to perform any operation, and is, for example, an execution command of a device program. In Modification Example (3), as an example of the operation command, a recovery operation command at the time when an abnormality has occurred in the industrial machine 30 is described. The operation command is not limited to a recovery operation, and may be a command for executing any operation. For example, the operation command may be a command for collecting the value of a public variable that has not been a collection target until then, or an interrupt for executing any operation.

For example, it is assumed that recovery procedure data indicating a recovery procedure to be executed when an abnormality has occurred is stored in the data storage 500 of the server 50. The industrial machine 30 operates based on device programs, and therefore the execution order of at least one device program to be executed during the recovery procedure is defined in the recovery procedure data. For example, the recovery procedure data is created by the second user. The operation command transmission module 502 determines whether an abnormality has occurred in the industrial machine 30 based on the collection data. When it is determined that an abnormality has occurred, the operation command transmission module 502 transmits the recovery procedure data to the controller 20. When the controller 20 receives the recovery procedure data, the controller 20 causes the industrial machine 30 to recover based on the recovery procedure indicated in the recovery procedure data. For example, when a device program indicated in the recovery procedure is also executed based on variables, the controller 20 controls the variables of the industrial machine 30 such that each device program is executed based on the recovery procedure indicated in the recovery procedure data.

According to Modification Example (3), based on the collected collection data, the collected data can be provided as feedback to the industrial machine 30 for operation of the industrial machine 30 by transmitting an operation command relating to the industrial machine 30. For example, when an abnormality has occurred in the industrial machine 30, it is possible to reliably recover from the abnormality that has occurred in the industrial machine 30 by performing a recovery operation based on the collected data.

(4) For example, the above-mentioned modification examples may be combined.

Further, for example, when a variable other than a public variable is specified as a collection target by the second user, the controller 20 may reject collection of the variable. For example, the controller 20 determines whether or not the variables specified as collection targets by the second user are included in the public variable list L. When a variable specified as a collection target by the second user is included in the public variable list L, the controller 20 permits acquisition of the value of the variable, and when a variable specified as a collection target by the second user is not included in the public variable list L, the controller 20 prohibits acquisition of the value of the variable. This processing may be executed by the industrial machine 30. In this case, the industrial machine 30 prohibits external reading of registers for variables other than public variables.

In addition, for example, the collection setting may be a setting other than the variables to be collected, the collection frequency, or the start condition. For example, the collection setting may be a data format of the collection data, a transmission destination of the collection data, or the industrial machine 30 for which the collection data is to be collected. Further, for example, there has been described a case in which the collection setting is performed by the second user, but it is not required that the collection setting be performed by the second user. In this case, all of the public variables may be collection targets. Further, for example, there has been described a case in which the values of the public variables in the storage 22 are copied to the IoT module 24, but the CPU 21 may execute the data collection without copying those values. Further, for example, there has been described a case in which the network between the controller 20 and the industrial machine 30 is different from the network between the controller 20 and the server 50, but those networks may be the same. Further, for example, there has been described a case in which the controller 20 acquires the values of the public variables based on the register information R, but the register operation corresponding to the variables may be executed by the industrial machine 30. Further, for example, there has been described a case in which the data collection is performed by the second user, who is different from the first user, but the user performing the data collection may be the same as the user of at least one of the controller 20 and the industrial machine 30.

Further, for example, as illustrated in FIG. 3 or FIG. 9, there has been described a case in which each function is assigned to each of the first user terminal 10, the controller 20, the industrial machine 30, the second user terminal 40, and the server 50, but the assignment of the functions is not limited to the example of FIG. 3 or FIG. 9. For example, at least one of the acquisition module 201 and the collection module 204 may be implemented by the first user terminal 10, the second user terminal 40, or the server 50. Further, for example, the recording module 501 may be implemented by the first user terminal 10, the controller 20, or the second user terminal 40. Further, for example, each function may be implemented by one computer instead of being assigned to a plurality of computers. Further, for example, the collection data may be recorded in an external computer other than the data collection system 1.

Further, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications.

What is claimed is:

1. A data collection system, comprising an industrial machine, a controller configured to control the industrial machine, and a server
    wherein the server includes a first storage,
    wherein the controller includes a second storage and a third storage,
    wherein the controller is further configured to:
        collect data on the industrial machine based on setting of a sharable public variable from among a plurality of variables of the industrial machine;
        acquire a value of the public variable from the industrial machine,
        record the acquired value in the second storage,
        control the industrial machine based on the value of the public variable,
        copy the value of the public variable recorded in the second storage to third storage,
        collect the data based on the value of the public variable copied to the third storage, and
        send the collected data to the server,
    wherein the server is configured to:
        receive the collected data from the controller, and
        record the collected data in the first storage.

2. The data collection system according to claim 1, wherein the controller is configured to:
    perform a collection setting relating to the data based on the public variable, and
    collect the data based on the public variable and the collection setting.

3. The data collection system according to claim 2,
    wherein the collection setting indicates a type of the public variable to be collected, and
    wherein the controller is configured to collect the data based on the type indicated by the collection setting.

4. The data collection system according to claim 3,
    wherein the collection setting indicates a collection frequency of the data, and
    wherein the controller is configured to collect the data based on the collection frequency indicated by the collection setting.

5. The data collection system according to claim 3,
    wherein the collection setting indicates a start condition of data collection, and
    wherein the controller is configured to start collection of the data based on the start condition indicated by the collection setting.

6. The data collection system according to claim 2,
    wherein the collection setting indicates a collection frequency of the data, and
    wherein the controller is configured to collect the data based on the collection frequency indicated by the collection setting.

7. The data collection system according to claim 6,
    wherein the collection setting indicates a start condition of data collection, and
    wherein the controller is configured to start collection of the data based on the start condition indicated by the collection setting.

8. The data collection system according to claim 1,
    wherein the collection setting indicates a start condition of data collection, and
    wherein the controller is configured to start collection of the data based on the start condition indicated by the collection setting.

9. The data collection system according to claim 1, wherein the server is configured to transmit to the controller an operation command relating to the industrial machine, based on the data.

10. The data collection system according to claim 1,
    wherein each of the controller and the industrial machine is connected to a network enabling synchronous communication, and
    wherein the server is configured to transmit the data based on a network different from the network.

11. The data collection system according to claim 1, wherein the controller is configured to:
    acquire a value of the public variable from the industrial machine based on register information on a relationship between the public variable and a register of the industrial machine, and
    collect the data based on the value of the public variable.

12. The data collection system according to claim 1, wherein the controller is configured to:

set the public variable specified by a user of at least one of the controller and the industrial machine, transmit the collected data to a user different from the user, and where in the server is configured to record in the first storage the data transmitted to the different user.

13. The data collection system according to claim 1, wherein:

the controller comprises a central processing unit (CPU) and an Internet-of-Things (IoT) unit, the CPU controls the industrial machine, the IoT unit comprises the third storage, and the CPU comprises the second storage.

14. The data collection system according to claim 13, wherein:

each of the second storage and the third storage stores all values of the public variable, the IoT unit narrows down a part of all of the values as the public variable to be collected, and collect the data based on the part of all of the values.

15. The data collection system according to claim 1, wherein the controller copies the value of the public variable periodically.

16. A data collection method, comprising:

collecting data on an industrial machine based on setting of a sharable public variable from among a plurality of variables of the industrial machine;

acquiring a value of the public variable from the industrial machine, recording the acquired value in a second storage in a controller, controlling the industrial machine based on the value of the public variable, copying the value of the public variable recorded in the second storage to a third storage in the controller, collecting the data based on the value of the public variable copied to the third storage, sending the collected data to a server, recording the collecte data in a first storage in the server.

17. A non-transitory computer readable information storage medium storing a program for causing a computer to:

collect data on an industrial machine controlled by a controller, based on setting of a charable public variable from among a plurality of variables of the industrial machine, acquire a value of the public variable from the industrial machine, record the acquired value in a second storage of the controller, control the industrial machine based on the value of the public variable, copy the value of the public variable recorded in the second storage to a third storage in the controller, collect the data based on the value of the public variable copied to the third storage, and send the collected data to a server, wherein the server is configured to:

receive the collected data from the controller, and record the collected data in a first storage.

* * * * *